UNITED STATES PATENT OFFICE.

ALOIS FLEISCHMANN, OF OLMUTZ, MORAVIA, AUSTRIA.

IMPROVED PROCESS OF TREATING MAIZE, BARLEY, AND OTHER CEREALS FOR THE MANUFACTURE OF ALCOHOL, &c.

Specification forming part of Letters Patent No. 43,555, dated July 12, 1864.

*To all whom it may concern:*

Be it known that I, A. FLEISCHMANN, of Olmutz, Moravia, Empire of Austria, have invented a certain new and Improved Process for Manufacturing Alcohol and other Spirituous Liquors from Indian Corn, Rye, Wheat, Barley, and other Cereals; and I do hereby declare the following to be a full description of the same.

The object of my invention is to obtain a greater quantity of alcohol from a given weight of Indian corn, rye, wheat, barley, or the other cereals, than has heretofore been obtainable by any other processes for making alcohol previously known to my invention.

It is a well-known fact that the gums and vitreous particles of cereals are less soluble than the other parts of the grain, and in the fermentation process, as commonly used in manufacturing alcohol, the saccharine matter of the grain is not fully developed as it should be. Consequently the percentage of alcohol obtained from the grain is less than a reasonable proportion for the known amount of saccharine matter absolutely contained in it. My invention therefore is to save this loss to the distiller, because just in the proportion as the saccharine matter of the cereals is developed or increased by a proper preparation of them by making the gums and vitreous particles more soluble, so will the fermentation be more complete or perfect and a larger percentage of alcohol obtained as the result of the distillation. To obtain this important result I have discovered that it is necessary to prepare the cereals by soaking them for a certain length of time in water charged with sulphurous-acid gas. By this means the vitreous particles and gummy matter of the grain are made more soluble, thereby increasing or stimulating the development of the saccharine matter in the cereals, and, as a matter of course, increasing the production of alcohol as the result of the distillation.

To describe my invention of a new process for manufacturing alcohol more freely I will specify the following for a given weight of grain as a formula that I have used with perfect success. I put twelve gallons of water in any suitable tub or other vessel for the purpose required and charge it with sulphurous-acid gas made from six and one-half ounces of sulphuric acid and two ounces of charcoal, and in any suitable chemical apparatus for such purposes. It will be obvious, however, that sulphurous-acid gas prepared by burning sulphur with charcoal or copper, or by other means, answers an equally good purpose, and therefore do not intend to limit myself to the use of any particular method of preparing the gas, so long as I preserve substantially the proportionate quantity of sulphurous-acid gas I obtain from the use of six and one-half ounces of sulphuric acid and two ounces of charcoal for a charge of twelve gallons of water. In this sulphurous-acid-gas water I put about one hundred pounds of either of the kinds of cereals intended to be used, previously crushed in any suitable mill for such purposes, to soak and allow it to remain in soak for about fifteen hours, except when Indian corn is the grain used, which will require about thirty hours soaking, as its gummy and vitreous particles are less soluble than the other cereals. After the soaking process the grain is then removed to the "mash-tub," to be mashed in the same manner and undergo a like treatment as is commonly adopted by distillers in the manufacture of alcohol from cereals, except when Indian corn is used, which does not require more than 150° of heat, or thereabout, Fahrenheit grade, in the mashing operation.

Having now described my new process for making alcohol and other spirituous liquors from cereals, I will set forth what I claim and desire to secure by Letters Patent:

The use of sulphurous-acid-gas water in the process hereinbefore described, for preparing Indian corn, rye, wheat, barley, and other cereals for the manufacture of alcohol and other spirituous liquors by distillation.

ALOIS FLEISCHMANN.

Witnesses:
Dr. ALBERT VON OLSHEMITZ,
Dr. ERWIN SUCHAUCK.